INVENTOR
L. HOCHGRAF
BY R. B. Anderson
ATTORNEY

United States Patent Office 3,519,935
Patented July 7, 1970

3,519,935

ARRANGEMENT FOR PROVIDING PARTIAL SERVICE ON A FAILED SERIALLY LOOPED CARRIER SYSTEM

Lester Hochgraf, Wall Township, Monmouth County, N.J., assignor to Bell Telephone Laboratories, Incorporated, Murray Hill, N.J., a corporation of New Jersey Filed June 21, 1966, Ser. No. 559,194
Int. Cl. H04b *1/60, 3/46*; H04j *3/14*
U.S. Cl. 325—2 9 Claims

ABSTRACT OF THE DISCLOSURE

In looped carrier systems, transmission and power failure sensing circuits detect failures and loop-back the carrier line short of the fault, thereby restoring service to that portion of the carrier line which is located between the office and the sensing circuit nearest the fault on the office side of the carrier line.

This invention relates to serially looped carrier systems in which a multiplicity of carrier terminals at different locations are linked to an office terminal to provide for derived transmission circuits which allow transmission from the office terminal to each of the remote terminals and from each of the remote terminals back to the office terminal.

In a serially looped carrier system an office terminal is linked to a number of serially connected remote terminals to provide for transmission channels between the office terminal and each of the remote terminals. Each of such remote terminals may provide one or more carrier derived circuits which appear on input and output terminals at both the office terminal and the remote terminals. Information to be transmitted from a particular circuit input terminal at the office terminal to the corresponding output terminal at a remote terminal may, for instance, be inserted in a time slot of a time-division carrier system or in an allocated frequency band of a frequency division carrier system. The information is extracted at the remote terminal from the carrier line and after decoding or demodulation is transmitted to the derived circuit output terminals. Likewise, information to be transmitted from a remote terminal to the office terminal is inserted into the same or a different time slot or is modulated into the same or a different frequency band and then put on the carrier line in the same direction as transmission from the office terminal. This signal, together with other signals, traverses the remainder of the carrier line and at the farthest terminal is returned to the office terminal on an inward carrier line.

This looped arrangement provides an extremely flexible and economical way for providing connections from one office terminal to a multiplicity of distributed remote terminals without the need for a multiplicity of carrier lines connecting the office terminal and each remote terminal. The carrier channels may be permanently assigned to a particular derived circuit or may be allocated to a derived circuit only for the duration of a connection. In the interest of simplicity the further description of this invention will be applied to a time-division carrier system but the principles described herein may also be applied to a frequency division serially looped system by means apparent to those skilled in the art.

A severe limitation of such a looped system is the interruption of service for the entire system by a failure of transmission at any point in the loop. This characteristic of complete failure is compounded in those installations where power to energize the remote terminals or power to energize the line repeaters is transmitted over the same or different conductors in the same cable used to transmit the carrier signals. Specifically failures may occur which interrupt transmission on the loop without interrupting the flow of power on the line conductors. Other kinds of failure may interrupt the flow of power on the line, thus shutting down transmission over the whole loop.

An object of this invention is to eliminate transmission failure of the entire serially connected carrier system caused by any type of localized line or equipment failure at a point remote from the office terminal.

Another object of the invention is to restore service automatically to that part of the loop which is still intact between the office terminal and the remote terminals on the office side of the fault.

Still another object of one form of the invention is to continue the transmission of carrier signals beyond the last operating remote station and into the faulty line section so that, if the fault clears or is cleared, transmission will be restored automatically to the remainder of the loop.

A further object of one form of the invention is to continue the transmission of signals into the faulty section to provide a signal for determining which elements of the system are operating thus helping to locate the faulty element.

A further object of the invention, on those systems which provide power to the line repeaters or to the remote terminals over the transmission conductors, is to cut off such power supply to the section just beyond the remote terminal where the power circuit has been opened, grounded, or shorted and to restore the power line continuity between the power suply oint and the remote terminal on the office side nearest the fault. This provides for normal flow of power in the unfaulted section of the line.

A still further object of the invention is to provide an indication at the office terminal of those line sections that are operating normally and those sections where the transmission has been looped back or the power line terminated.

To fulfill these objects, the invention provides for a plurality of circuits whereby the transmission signals may be looped back on the inward carrier line short of the fault point. The invention also provides a plurality of circuits whereby the power circuit loop may be completed at any remote terminal short of the fault and the remainder of the line cut off so that the failure does not constitute a hazard to the power supply section which is kept operating.

A preferred location for the transmission loop-back circuits and the power line terminating and cutoff circuits is adjacent to the remote terminals except for the most remote terminal. It is apparent that this location provides restoral for failures occurring at any arbitrary points along the carrier line to the greatest number of remote terminals. It also permits integration of certain parts of the signal detection, status, and command functions which are described herein as entirely separate pieces of equipment but which may in fact be more easily and economically derived from the remote carrier terminal equipment.

In the system described, the automatic operation of a loop-back switch is effected locally and the logic for operation and restoral of the loop-back switch is determined without communication between the remote terminals or between any remote terminal and the office terminal. The above and other features of the invention will be more fully understood from the following detailed description. In the drawings.

Figure 1:
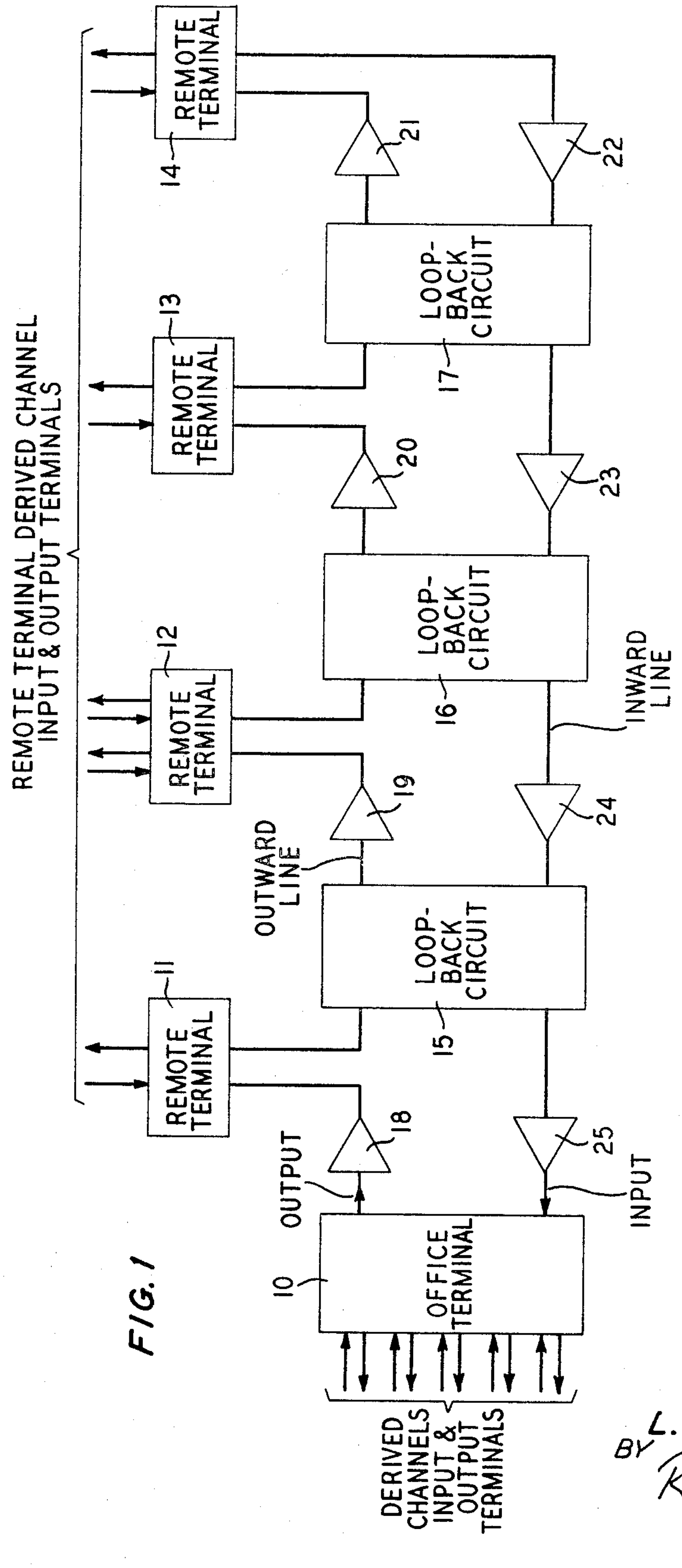
FIG. 1 is a block diagram of a specific embodiment of the invention using loop-back circuits located along the series carrier loop.

The serially looped time-division carrier system of FIG. 1 originates and terminates at office terminal 10 and comprises serially connected remote terminals 11 through 14, loop-back circuits 15, 16, and 17, and line repeaters 18 through 25. A plurality of carrier derived circuits have input and output connection terminals on office terminal 10. The other ends of the corresponding derived circuits are distributed among remote terminals 11, 12, 13, and 14, each of which may provide for and have connections to one or more carrier derived circuits.

The carrier line may be arbitrarily divided into an outward and inward line. The outward line originates at the output of office terminal 10 and comprises serially connected remote terminals 11 through 14, together with line repeaters 18 through 21. The inward line runs parallel to the outward line and connects the last remote terminal of the outward line through serially connected repeaters 22 through 25 to the carrier input terminal of office terminal 10. Loop-back circuits 15 through 17, individually associated with respective remote terminals, provide a means for looping back transmission signals from the outward to the inward carrier line or for terminating the repeater and remote terminal power supply line at each point and cutting off the remainder of the power supply line.

In the operation of the carrier system, each derived circuit inserts information in an assigned time slot of the time-division carrier system and extracts this information at the remote terminal for transmission to the derived circuit output terminal. The remote terminal encodes and inserts information from the input line of the derived circuit into the same or a different time slot in the carrier signal, transmitting it on the outward line. This carrier signal then traverses all the remaining remote terminals and line repeaters and is returned to the office terminal on the inward carrier line. It is evident from FIG. 1 that an interruption on the series carrier loop at any point disrupts two-way transmission for the entire loop and for all remote terminals. Loop-back circuits 15, 16 and 17 are therefore provided in the present invention to eliminate failure of the entire carrier system resulting from a localized failure along the carrier loop.

When, for example, a failure occurs at line repeated 19, loop-back circuit 15 loops back transmission and establishes service for the partial loop including office terminal 10, repeaters 18 and 25, and remote terminal 11, while disconnecting the remainder of the loop. Similarly, when a failure occurs at remote terminal 14, loop-back circuit 17 becomes activated, disconnecting the part of the loop consisting of remote terminal 14 and repeaters 21 and 22, while looping back through loop-back circuit 17 to complete the partial loop including office terminal 10, and remote terminals 11, 12, and 13 together with line repeaters 18 through 20 and 23 through 25.

Figure 2:
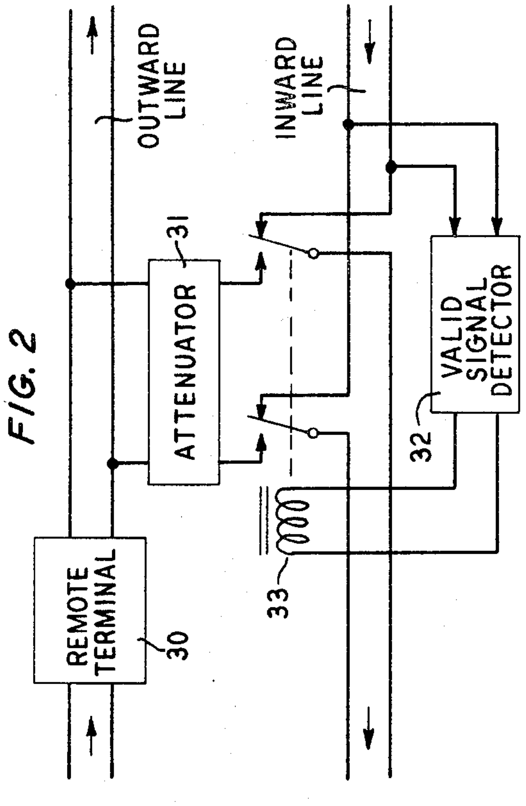
FIG. 2 is a block diagram of one specific loop-back circuit used in the embodiment of the invention of FIG. 1 to respond to system transmission failures.
Figure 5:
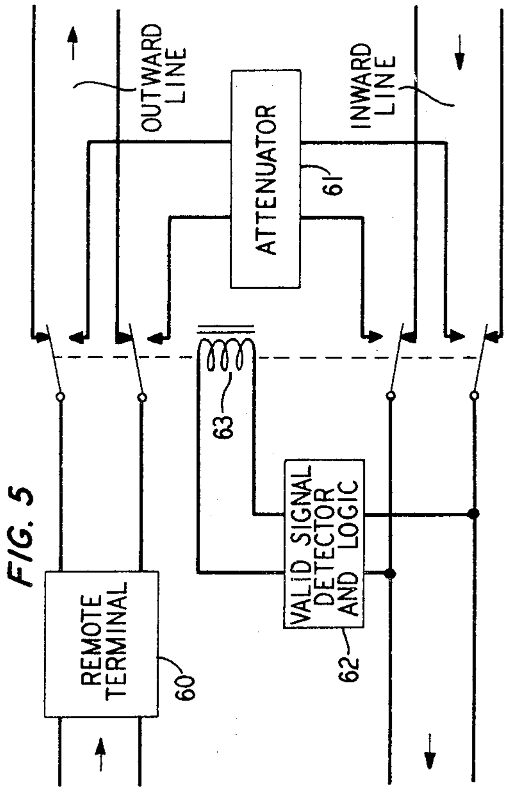
FIG. 5 is a block diagram of another loop-back circuit used in the embodiment of the invention of FIG. 1 to respond to system transmission failures.
Figure 7:
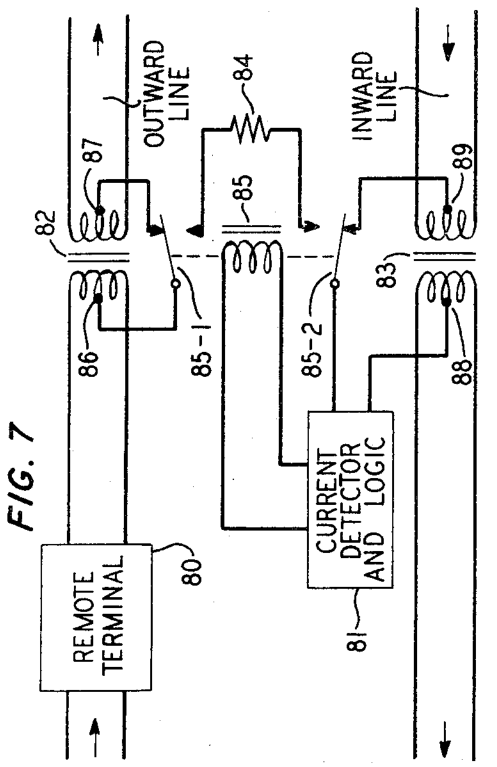
FIG. 7 is a block diagram of one specific loop-back circuit used in the embodiment of the invention of FIG. 1 to respond to system power failures.

Loop-back circuits 15 through 17 generally comprise a failure sensing circuit and a loop-back switch. Depending, however, upon the particular circuit application and the specific circuit control desired, specific loop-back circuits may take on various configurations as illustrated in FIGS. 2, 5, and 7. Where, for example, the carrier system is to be protected from transmission failures, the failure sensing circuit consists of a valid signal detector together with required logic circuitry. When, on the other hand, power loop failures are to be prevented from causing a system failure, the signal detector of the failure sensing circuit is replaced by a current detector to sense such power failure. Similarly, the loop-back switch may be placed in both the outward and inward line of the carrier loop or switching may take place in but one of the two lines.

FIG. 2 illustrates one specific loop-back circuit which may be used in the embodiment of the invention of FIG. 1. The loop-back circuit is associated with a remote terminal 30 and comprises an attenuator 31, valid signal detector 32, and a loop-back switch consisting of relay 33 with its associated relay contacts. Signal detector 32, which senses the transmission signal on the inward line of the carrier loop, controls relay 33. The contacts of relay 33, in turn, either maintain the inward line completed or provide for both a loop-back through attenuator 31 and the interruption of the inward line.

During normal operation of the carrier system, relay 33 is de-energized and the inward line of the carrier loop remains completed through the normally closed contacts of relay 33. When, on the other hand, signal detector 32 senses a transmission failure, it energizes relay 33. As a result, the normally open contacts of relay 33 become closed, thereby interrupting the inward line of the carrier loop to disconnect the faulted section and, in addition, looping back the outward line to the inward line through attenuator 31 to complete a partial loop on the office terminal side of the loop-back circuit. It is to be understood that any other suitable transmission circuit such as an amplifier may be substituted for attenuator 31 to provide for the auxiliary transmission path. However, as soon as signal detector 32 detects that the particular transmission failure is again removed, relay 33 is de-energized, thereby discontinuing the loop-back condition and again restoring the original complete carrier loop.

Figure 3:
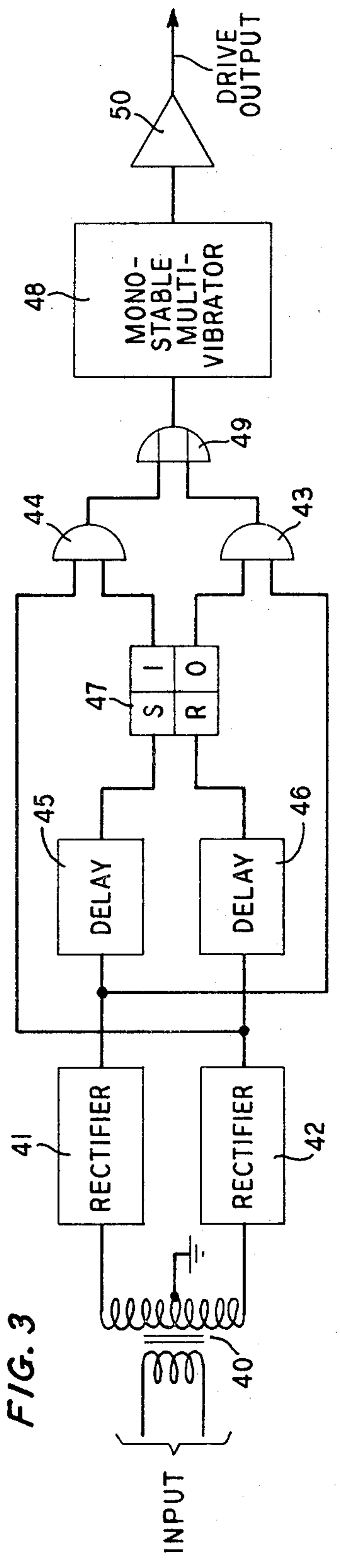
FIG. 3 is a block diagram of a specific valid signal detector used in conjunction with the loop-back circuit of FIG. 2.

In a serially looped time-division carrier system employing a bipolar train of pulses, i.e., message pulses are alternately positive and negative, valid signal detector 32 of the loop-back circuit illustrated in FIG. 2 may, for example, be of the type disclosed in U.S. Pat. 3,048,819, issued Aug. 7, 1962, to G. K. Helder et al. A block diagram of such a signal detector is shown in FIG. 3. The input signal taken from the inward line of the carrier loop of FIG. 2 is applied to the signal detector of FIG. 3 through transformer 40 to rectifiers 41 and 42 to generate two pulse trains of opposite polarity. The output pulses of rectifier 41 correspond to the positive pulses of the input pulse train, whereas the output pulses of rectifier 42 correspond to the negative pulses of the input pulse train. One output from rectifiers 41 and 42 is directly and individually applied to one input of AND gates 43 and 44, respectively. Another output from each of the rectifiers 41 and 42 is additionally applied through delay units 45 and 46, respectively, and through bistable multivibrator 47 to another input of AND gates 44 and 43. Bistable multivibrator 47 has two stable output states; one output corresponding to a first one of the two stable output states is obtained in output 1 by applying a pulse to set-input S, whereas another output corresponding to a second one of the two stable states is obtained by applying a pulse to reset-input R of the bistable multivibrator. AND gates 43 and 44 transmit pulses only when their respective input pulses occur simultaneously and are of equal predetermined polarity. The combined action of the respective inputs to AND gates 43 and 44 prevents an output from either AND gate as long as the pulse train maintains its required bipolar characteristic, i.e., as long as the pulses of the pulse train are alternately positive and negative. However, whenever the bipolar requirement is violated, that is, when successive pulses are of the same polarity, one of the AND gates 43 or 44 in FIG. 3 is allowed to transmit a pulse, thereby initiating the quasi-stable state of monostable multivibrator 48 through OR gate 49. The output of monostable multivibrator 48, in turn, is coupled through amplifier 50 to energize relay 33 of the loop-back circuit of FIG. 2 to effect the loop-back condition. The duration of the quasi-stable state of monostable multivibrator 48 is a pulse generally substantially longer than the line pulses. If, at the end of the quasi-stable state, valid signal transmission has not been resumed, monostable multivibrator 48 again immediately returns to its quasi-stable state to hold relay 33 energized, thereby maintaining the loop-back condition.

Where, as in the carrier system illustrated in FIG. 1, a plurality of loop-back circuits of the type illustrated in FIG. 2 are distributed along the loop, each loop-back circuit automatically and independently loops back when failures occur on the loop side of a particular loop-back circuit, i.e., on the side remote from office terminal 10. For example, loop-back circuit 17 loops back whenever a transmission failure occurs on the loop side of loop-back circuit 17, as for instance at remote terminal 14, or line repeaters 21 and 22, or their interconnecting lines. Should a failure occur at repeated 19, on the other hand, loop-back circuit 15 loops back to maintain operation of the partial loop including office terminal 10, remote terminal 11, and repeaters 18 and 25.

The switching of the loop-back circuits of the carrier loop as a result of a failure at line repeater 21 of the carrier loop of FIG. 1, for instance, has the following described sequence. As soon as a failure occurs as repeater 21, the signal detectors of loop-back circuits 15 through 17 detect this failure. Each of these loop-back circuits therefore opens the inward line at its location and switches its respective loop-back switch into the loop-back position. As a result of this looping back, the overall loop is divided into four partial loops. The operating condition within each partial loop, except for the first partial loop, determines the action the preceding loop-back circuit will take following the initial loop-back action.

The first partial loop includes office terminal 10, remote terminal 11, line repeaters 18 and 25, and the loop-back switch of loop-back circuit 15. Transmissions originating at office terminal 10 are circulated through this loop and, in addition, are transmitted through the outward line to the succeeding partial loops of the carrier system. No fault exists in the next partial loop which includes remote terminal 12, line repeaters 19 and 24, and which is completed through the loop-back switch of loop-back circuit 16. Valid signal transmissions are therefore returned to and sensed by the signal detector of loop-back circuit 15. As a result, the loop-back condition of loop-back circuit 15 is removed, thereby extending the partial operative loop from office terminal 10 through loop-back circuit 16 and back to office terminal 10.

Similarly, the signal detector of loop-back circuit 16 then senses the valid signal transmitted through the third partial loop from the office terminal through remote terminal 13, line repeaters 20 and 23, and the loop-back switch of loop-back circuit 17. Consequently, the loop-back condition of loop-back circuit 16 is also removed, whereby the partial operative loop is now extended from office terminal 10 through the loop-back switch of loop-back circuit 17 back to office terminal 10. However, because of the fault at line repeater 21, transmission through the fourth partial loop cannot be completed. As a result, the signal detector of loop-back circuit 17 still senses a system failure and loop-back circuit 17 remains in the loop-back condition, thereby keeping the return line of the faulted section of the loop disconnected and maintaining service for the carrier loop on the office side of loop-back circuit 17, i.e., from office terminal 10 through loop-back circuit 17 back to office terminal 10. As soon as the fault at line repeater 21 is removed, however, the signal detector of loop-back circuit 17 again senses a valid signal transmission. As a result, loop-back circuit 17 automatically removes the loop-back condition and restores carrier service for the entire loop.

It is evident that the operating condition of the carrier loop is reflected by the activation of particular loop-back circuits. A status signal may therefore be advantageously transmitted from an activated loop-back circuit back to the office terminal to indicate a failure in the carrier loop. Such a status signal lends itself particularly well to the location of carrier system troubles to speed up the necessary repairs to restore service on the entire loop.

In order to facilitate such a status signal, the time-division carrier system provides for a status channel within which each remote terminal has assigned to it a specific time slot in which to insert a status signal for its associated loop-back circuit. The input for such a status channel is derived from the signal detector of a respective loop-back circuit, where the input reflects the loop-back condition of that particular loop-back circuit. The status signal input from the signal detector is applied to the associated respective remote terminal to be coded and to be inserted in the correct time slot of the status channel of the carrier stream to be transmitted to the office terminal. At the office terminal, the information of the status channel is extracted to indicate the loop-back condition of individual loop-back circuits. From this information it may be readily determined which section of the carrier loop is inoperative.

Similarly, the time-division carrier system may provide for a command channel to send command signals to specific remote stations to activate their associated loop-back circuitry. Within such command channels each remote terminal has assigned to it a specific time slot in which the command signals directed to it are transmitted. The command channels provide, among other things, an arrangement for checking the operation of individual loop-back switches and the switching sequence of loop-back operation from the office terminal.

Figure 4:
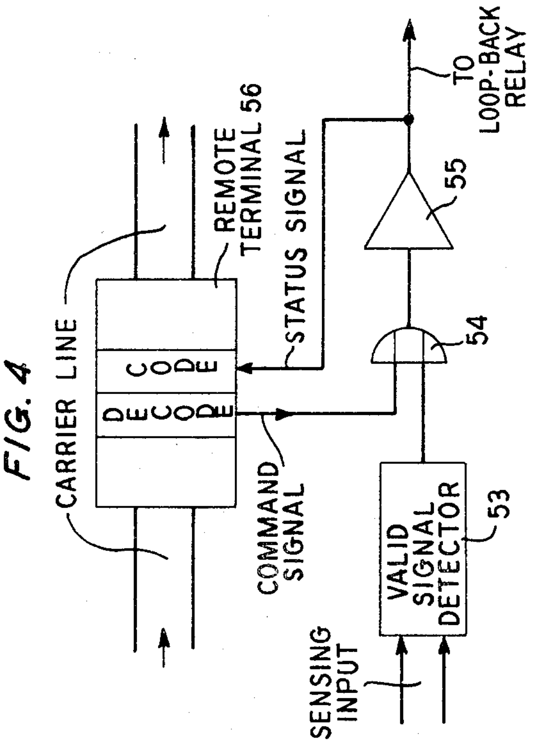
FIG. 4 is a block diagram illustrating the incorporation of command and status signals in the loop-back circuit of FIG. 2.

FIG. 4 illustrates an adaptation of the circuit of FIG. 2 to provide for status and command functions in addition to the normal automatic switching functions of the loop-back circuit. The circuit of FIG. 4 comprises valid signal detector 53, OR gate 54, driver amplifier 55, and remote terminal 56. Remote terminal 56 includes coding circuits which permit status indications of the condition of the loop-back circuit associated with remote terminal 56. These indications are inserted in the carrier signal train and are transmitted to the office terminal regardless of whether the loop-back relay has switched the carrier line through or has looped the carrier line back. Remote terminal 56 also includes decoding circuits whereby a command signal addressed to remote terminal 56 is caused to generate a command pulse to OR gate 54. If the carrier system is operating normally the status signal sent back indicates a switch-through condition of the loop-back switch at remote terminal 56. Transmission of the command addressed to remote terminal 56 generates a pulse through OR gate 54 which actuates the loop-back relay of the loop-back circuit through driver amplifier 55. The status signal will thereupon indicate loop-back. The loop-back switch remains in this condition as long as a command signal continues to be received at remote terminal 56. When the command signal is removed the loop-back system returns to normal operation.

Alternatively, the desired loop-back function upon failure of valid signal transmission which was described in connection with FIG. 2 may be accomplished by the circuit illustrated in FIG. 5. In this circuit the loop-back switch interrupts both the outward and the inward line, thereby completely disconnecting the remaining loop from the preceding restored partial loop. This loop-back arrangement protects the restored partial carrier loop from line conductor shorts and line conductor grounds close to a loop-back point which otherwise in the circuit of FIG. 2 would cause partial or complete transmission loss and therefore render the particular loop-back ineffective. In FIG. 5 the loop-back circuit is associated with a remote terminal 60 and comprises an attenuator 61, a valid signal detector and logic unit 62, and a loop-back switch consisting of relay 63 with its associated relay contacts. Valid signal detector and logic unit 62 senses the transmission signal on the inward line of the carrier system on the office terminal side of the loop-back circuit and controls the operation of relay 63 as a function of the transmission signal. The contacts of relay 63, in turn, either complete the inward and outward lines, or provide for a loop-back through attenuator 61.

Figure 6:
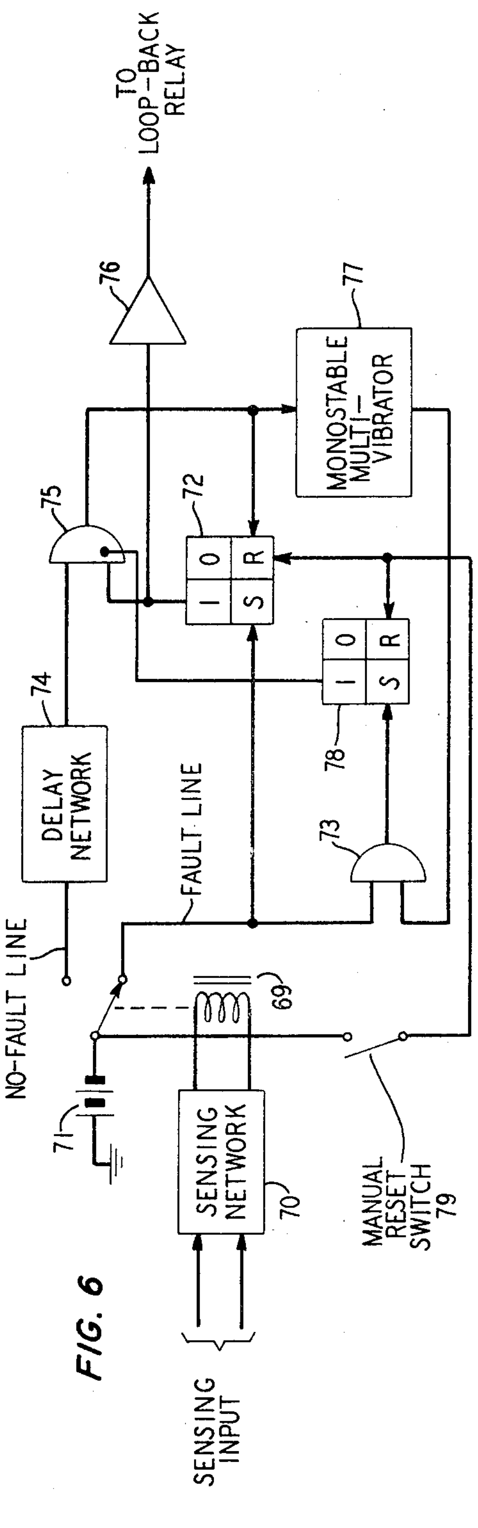
FIG. 6 is a block diagram of a typical logic circuit used in conjunction with the loop-back circuit of FIG. 5.

During normal operation of the carrier system, relay 63 is de-energized and both the inward and outward lines of the carrier loop remain completed through the normally closed contacts of relay 63. When signal detector 62 senses a transmission failure, on the other hand, it energizes relay 63. As a result, the normally open contacts of relay 63 become closed, thereby interrupting the inward and outward lines of the carrier loop to disconnect the remaining loop section and, in addition, looping back the outward line to the inward line through attenuator 61 to complete a partial loop on the office terminal side of the loop-back circuit. The logic circuitry of valid signal detector and logic unit 62 maintains the proper loop-back circuit in the loop-back condition to effect the desired partial carrier loop. An example of valid signal detector and logic unit suitable for use in the manner illustrated in FIG. 5 is shown in FIG. 6. The signal sensing input is applied to sensing network 70, which may be of the type shown in FIG. 3 and described in conjunction with the loop-back circuit of FIG. 2. For example, as a result of a transmission failure of line repeater 21 of FIG. 1, signal sensing circuits of loop-back circuits 15, 16, and 17 do not receive valid signals on the inward line. Each sensing circuit 70 puts a pulse output on relay 69 which applies negative voltage from source 71 to the fault line which connects to bistable multivibrator 72 and AND gate 73. As a result of the fault voltage applied to input S, bistable multivibrator 72 changes its state, thereby energizing its associated loop-back relay through driver amplifier 76. Each of the three loop-back circuits 15, 16, and 17 thus assumes a loop-back condition. At this time valid transmission will occur over the partial loop from office terminal 10 to line repeater 18, remote terminal 11, loop-back circuit 15, and line repeater 25 to the carrier input side of the office terminal. The signal sensing network at loop-back circuit 15 senses the restoration of the transmission signal and releases relay 69 and applies the negative power source 71 to the no-fault line. After the end of the delay of network 74, Inhibit gate 75 passes the no-fault signal to reset bistable multivibrator 72. This in turn causes the associated loop-back relay to be de-energized and again completes the outward and inward lines to the next remote section of the carrier loop. As a result, loop-gack circuit 16 now senses restoral of signal and after a prescribed delay completes the outward and inward lines to the next outward section as described for loop-back circuit 15. Loop-back circuit 17 then switches from loop-back to normal transmission. Because of the fault condition at repeater 21, however, the carrier transmission over the entire loop will again be interrupted as soon as the loop-back condition is removed by circuit 17 following its no-fault signal input.

As a result, all sensing networks at loop-back circuits 15, 16, and 17 lose valid signals on the inward line and again switch to the loop-back condition. The restoration sequence starts over again and switches transmission through the loop-back circuits 15 and 16 as described. The circuitry of FIG. 6 performs the required function to stop switch-through at loop-back circuit 17 and continues the loop-back condition after the second switching sequence of the section containing the fault.

When at the end of the first switching sequence loop-back circuit 17 senses the no-fault condition of the preceding section, the output of Inhibit gate 75, in addition to being applied to bistable multivibrator 72, also is applied to and triggers monostable multivibrator 77. The output of monostable multivibrator 77 is applied to AND gate 73. Because of the fault at line repeater 21, the signal sensing network 70 immediately fails to receive valid digital signals and generates a signal on the fault line. The fault line signal, besides setting bistable multivibrator 72 to again energize the loop-back relay, is also applied to AND gate 73. The duration of the pulse generated by monostable multivibrator 77 is long enough to maintain a pulse output during this second switching sequence of the sensing network so that AND gate 73 can now produce an output in response to the immediate fault signal to set bistable multivibrator 78. The output of bistable multivibrator 78 in turn produces an inhibit pulse on Inhibit gate 75. This prevents Inhibit gate 75 from passing any pulses, thereby holding loop-back circuit 17 in a locked loop-back condition. Consequently loop-back circuit 17 is no longer able to respond to either fault or no-fault signals. At the end of the second switching sequence, loop-back circuit 17 cannot remove its loop-back condition in response to the no-fault signal which occurs as a result of looped back transmission in the preceding part of the loop that is between loop-back circuit 17 and office terminal 10. After the fault at line repeater 21 has been repaired, the loop may again be completed, for example, by closing manual reset switch 79, which resets bistable multivibrators 72 and 78. The reset action results in de-energization of the loop-back relay and removal of the loop-back condition. The resetting of bistable multivibrator 78 also removes the inhibit input to Inhibit gate 75, whereby the loop-back circuit is again rendered responsive to any further fault signals which may occur.

Delay network 74 in each loop-back circuit has greater delay than the duration of the pulse output of monostable multivibrator 77. At loop-back circuit 16 the second transmission failure caused by loop-back circuit 17 switching into the faulty line occurs after monostable multivibrator 77 has returned to its normal condition and has removed the pulse from AND gate 73. This occurs because the delay of delay network 74 at loop-back circuit 17 is longer than the pulse duration of the monostable multivibrator 77 of any of the loop-back circuits. Thus, upon initiation of the second transmission failure at loop-back circuit 16, it performs identically as described for the first transmission failure and does not lock up in the loop-back condition. A similar action occurs at loop-back circuit 15 when the second transmission failure occurs at this point, caused by loop-back circuit 17 switching into the faulty section.

FIG. 7 shows a block diagram of another specific loop-back circuit that may be used in the embodiment of the invention of FIG. 1 to sense system power failures. Such power loop-back circuits can be used either in carrier systems in which energizing power is furnished for the entire carrier system, that is, for charging batteries at the remote terminals and for energizing line repeaters, by transmitting power from the office terminal over the transmission or other conductors, or in carrier systems in which power is furnished over conductors from a respective terminal for the line repeaters located between the terminal supplying power in the next following terminal. The loop-back circuit of FIG. 7 is associated with remote terminal 80 and comprises current detector and logic circuit 81, carrier transformers 82 and 83, resistor 84, and loop-back switch consisting of relay 85 with its associated relay contacts 85–1 and 85–2. Current detector 81, which senses and is responsive to the current in the inward line of the carrier loop, controls the operation of relay 85. The contacts of relay 85, in turn, either maintain the power circuit completed or establish a partial power loop by closing the loop through resistor 84.

During normal operation of the carrier system, relay 85 is de-energized, thereby completing the power path for the entire carrier system. For the outward line, the power connection is completed by connecting center taps 86 and 87 through normally closed relay contacts 85–1, whereas the inward line connection is completed by connecting center taps 88 and 89 through normally closed relay contacts 85–2 and through current detector 81. On the other hand, when current detector 81 senses a current failure it energizes relay 85, whereby relay contacts 85–1 and 85–2 are opened. As a result, the connections between center taps 86 and 87 and between center taps 88 and 89 are broken, and center taps 86 and 88 are instead directly connected through relay contacts 85–1 and 85–2 and through resistor 84, thereby disconnecting the faulted section and completing the power circuit for the partial loop on the office terminal side of the loop-back circuit. Resistor 84 serves as a dummy load to simulate the resistance of the disconnected part of the power line circuit. As soon as the loop-back condition is established, power is being restored to that part of the carrier system located between the loop-back position and the office terminal as long as no power fault exists in this part of the loop. Current detector 81 immediately senses this restoration of power and therefore allows relay 85 to de-energize again. If the original power failure in the remaining loop still persists, the current detector tends to oscillate between the loop-back and through condition. Certain logic circuitry is incorporated in the circuitry of detector 81 in order to prevent such switching oscillation. This logic circuitry may be identical to the logic circuitry required for and described in connection with the loop-back circuit of FIG. 5 and as shown in FIG. 6. Sensing network 70 generates fault and no-fault signals in response to the value of the current in the power loop to activate a loop-back and cutoff relay through logic circuitry. The switching sequence in response to a fault condition at a particular loop-back location is identical to that described in conjunction with a carrier loop-back circuit as shown in FIG. 5.

The present invention provides, therefore, in a series carrier loop for a versatile and simple fault sensing means together with a capability to restore carrier service to that part of a carrier loop which is located between the fault and the office terminal.

It is to be understood that the above-described arrangements are illustrative of the application of the principles of the invention. Numerous other arrangements may be devised by those skilled in the art without departing from the spirit and scope of the invention.

What is claimed is:

1. In a carrier system serially looped between the output of an office terminal, at least two remote terminals, and an input of said office terminal, said serial loop having an outward line and an inward line, said outward line serially connecting said output of said office terminal with said remote terminals, said inward line connecting said input of said office terminal to the last remote terminal in said outward line, thereby completing the carrier system loop, at least one failure sensing means located on said carrier loop at a point remote from said office terminal to detect a carrier system failure, and switching means responsive to a respective failure-sensing means to loop-back said carrier system between said office terminal output and said office terminal input through said switching means, and logic means for automatically maintaining the loop back nearest the failure on the office terminal side thereof and removing any remaining loop backs, thereby disconnecting that part of the carrier system including the fault and restoring carrier service between said office terminal output and input through said switching means for the remainder of said carrier system.

2. A carrier in accordance with claim 1 in which said failure sensing means is located on said inward line and is responsive to transmission failures of said carrier system between said failure sensing means and said output of said office terminal and which includes an auxiliary transmission path associated with each of said switching means, said switching means being located between a respective failure sensing means and said input to said office terminal, and said switching means interrupting the path of said inward line and looping back said outward line to said inward line through a respective auxiliary transmission path in response to said failure sensing means, thereby restoring carrier service through said switching means between said output and input of said office terminal and said remote terminals within said remaining loop and continuing the transmission connection between the output of said office terminal and said outward line to the failure sensing means to effect removal of said loop-back path when the transmission failure is removed.

3. A carrier system in accordance with claim 2 and further including command and status channels to provide for the transmission of command signals from said office terminal through a respective remote terminal to the failure sensing means associated with said remote terminal and for the transmission of status signals to said office terminal from said remote terminals in response to a respective failure sensing means associated with said remote terminals, and in which each of said failure sensing means further includes logic circuit means responsive to the command signals supplied from said office terminal to said failure sensing means to control the operating condition of said respective failure sensing means, said logic circuitry also being responsive to the operating condition of the respective failure sensing means, and the output of the logic circuitry being supplied to said office terminal through said status channel, whereby the operating condition of a respective failure sensing means is indicated to and controlled by the office terminal through the respective status and command channels.

4. A carrier system in accordance with claim 1 in which said failure sensing means is located on said inward line between said switching means and said office terminal input and is responsive to current failures of the energizing power of said carrier system and which includes an auxiliary transmission path associated with each switching means, said switching means interrupting the power path of said inward line and the power path of said outward line in response to an energizing power current failure, said switching means looping back the power path of said outward line to the power path of said inward line through a respective auxiliary transmission path and failure sensing means, thereby restoring normal energizing power current through said switching means between said output and input of said office terminal and through the remote terminals within said remaining loop.

5. A carrier system in accordance with claim 4 in which each of said failure sensing means further includes logic means, responsive to said sensing means output, said logic means output driving said respective switching means, and said logic means locking into loop-back condition the last loop-back circuit preceding a fault in the carrier system energizing loop, and means to release such locking condition to restore energizing power to the interrupted power path of the outward and inward line, thereby providing for a partial power loop between said office terminal and said last loop-back circuit.

6. A carrier system in accordance with claim 5 further including command and status channels to provide for the transmission of command signals from said office terminal through a respective remote terminal to the failure sensing means associated with said remote terminal and for the transmission of status signals to said office terminal from said remote terminals in response to a loop-back condition of respective switching means associated with said remote terminals, and in which each of said failure sensing means includes additional logic circuits means, said additional logic circuit means being responsive to the command signals supplied from said office terminal to said failure sensing means to control the operating condition of said respective failure sensing means, said additional logic circuit means also being responsive to the operating condition of the respective failure sensing means, and the output of said additional logic circuit means being supplied to said office terminal through said status channel, whereby the operating condition of a respective failure sensing means is indicated to and controlled by the office terminal through the respective status and command channels.

7. A carrier system in accordance with claim 1 in which said failure sensing means is located on said inward line between said switching means and said office terminal input and is responsive to transmission failures of said carrier system and which further includes an auxiliary transmission path associated with each switching means, said switching means interrupting the path of said inward line and of said outward line in response to a carrier system transmission failure, and said switching means looping back said outward line to said inward line through a respective auxiliary transmission path, thereby restoring carrier service through said switching means between said output and input of said office terminal and the remote terminals within said remaining loop.

8. A carrier system in accordance with claim 7 in which each of said failure sensing means further includes logic means, responsive to said sensing means output, said logic means output driving said respective switching means, and said logic means locking into loop-back condition the last loop-back circuit preceding a fault in the carrier loop, and means to release such locking condition to restore transmission to the interrupted outward and inward carrier line, thereby providing for a partial carrier loop between said office terminal and said last loop-back circuit.

9. A carrier system in accordance with claim 8 and further including command and status channels to provide for the transmission of command signals from said office terminal through a respective remote terminal to the failure sensing means associated with said remote terminal and for the transmission of status signals to said office terminal from said remote terminals in response to a respective failure sensing means associated with said remote terminals and in which each of said failure sensing means includes additional logic circuitry, said additional logic circuitry being responsive to the command signals supplied from said office terminal to said failure sensing means to control the operating condition of said respective failure sensing means, said additional logic circuitry also being responsive to the operating condition of the respective failure sensing means, and the output of said additional logic circuitry being supplied to said office terminal through said status channel, whereby the operating condition of a respective failure sensing means is indicated to and controlled by the office terminal through the respective status and command channels.

References Cited

UNITED STATES PATENTS 3,100,869 8/1963 Disson et al. ----- 179—175.31

FOREIGN PATENTS 547,165 10/1957 Canada.

ROBERT L. GRIFFIN, Primary Examiner

A. J. MAYER, Assistant Examiner

U.S. Cl. X.R.

179—15, 175.3